Patented Oct. 8, 1935

2,016,529

UNITED STATES PATENT OFFICE 2,016,529

MANUFACTURE OF BARIUM HYDRATE

Robert Erwin Windecker, Painesville, Ohio

No Drawing. Application July 22, 1933,
Serial No. 681,761

8 Claims. (Cl. 23—186)

In the manufacture of barium hydrate from precipitated or natural barium carbonate, several processes have been developed. In one, which is probably the most used, the carbonate is packed with carbon in small retorts and heated for several days. These processes are expensive in operation and require much time. The present invention overcomes this difficulty by passing the materials in a continuous stream through a kiln. Thus costs are greatly reduced and the product is obtained in a very few hours. Other processes require excessive temperatures to decompose the barium carbonate, and give only incomplete reactions at such excessive temperatures. This latter difficulty has been overcome and reaction in the kiln made possible by adding certain materials to the carbonate. It is well known that barium oxide is extremely reactive at high temperatures, in that it will react with silicious and many other refractories as well as metals, forming compounds of low fusion point. This fact makes the securing of a retaining vessel for the decomposition of barium carbonate an almost insurmountable problem. This problem has been completely solved not so much by the selection of a refractory which will contain the barium oxide formed at reaction temperature, as by preventing the barium oxide formed from reacting with the containing vessel. Thus barium oxide and, on lixiviating, barium hydrate can be manufactured continuously in the same apparatus without frequent shut-down to renew the apparatus, and without complete replacement at intervals.

The principal object of this invention is to produce barium hydrate at a cost which is markedly lower than heretofore possible, and to achieve this object by carrying out the process in a continuous operation requiring a minimum of steps and apparatus and with a minimum of fuel and power consumption.

More specifically, it is an object to make possible the reduction of barium carbonate economically in an ordinary open kiln and without necessitating the exclusion of air.

A further object is to cause the formation in the kiln of small aggregates or clinker nodules which pass through the heated kiln without fusing together into large aggregates and without fusing to the kiln wall, and to provide for complete or nearly complete reduction of the barium carbonate in an open kiln at a temperature which is not excessive.

A still further object is to produce the finished product from the barium carbonate in a few hours' time, thus eliminating the necessity of having many times the day's production in the process of completion.

I attain the foregoing and other and more limited objects by mixing the barium carbonate with a reducing agent as carbon or a suitable carbonaceous material and with a material such as lime which prevents the fusion of the barium carbonate and oxide together or to the kiln and causes the formation of small clinker nodules, and promotes the speed and completeness of the reaction. This mixture is ground and passed through a kiln which is sufficiently heated to cause the barium carbonate to be reduced.

The mass of clinker nodules on issuing from the kiln may be lixiviated with water at once and the soluble barium hydrate separated from the insoluble material by filtration. I have found that if carbon alone is mixed with the barium carbonate and the mixture heated in a kiln, the raw material and the reaction products fuse together and to the kiln, thereby stopping production. However, if lime or equivalent material hereafter mentioned is mixed in sufficient quantity with the barium carbonate and carbon, the mixture passes through the kiln in small nodules without fusion together or to the kiln. Should lime alone be mixed with the barium carbonate, and the material passed through the kiln at the same temperature, only an impractical quantity of the barium carbonate would be decomposed. To increase the yield, the temperature would necessarily have to be raised. If the temperature were raised, more lime would be required to prevent fusion, and finally, in order to obtain an appreciable yield, the temperature would have to be increased to such an extent that no suitable refractory would be practically available and the fuel cost would be prohibitive. But I have found that when barium carbonate is mixed with a material such as lime, and a reducing material such as carbon, the reaction proceeds at a workable temperature to produce a high yield of product with great economies and without destruction to the reaction apparatus.

To more clearly illustrate my invention, the following examples are given:

*Example I.*—100 pounds of precipitated or natural barium carbonate, 50–80 pounds of lime, 18 pounds of petroleum coke and 12 pounds of by-product coke are ground together to a fineness exceeding 100% through a 100-mesh sieve. The material is agglomerated in an appropriate device and then passed slowly through a rotary kiln in which the hot zone temperature is maintained at about 2600° to 2800° F. The resulting output of clinker nodules is then treated with water and the soluble barium hydrate separated from the lime and a small amount of undecomposed carbonate by filtration. Experiment has shown that when as little as 40 pounds of calcium oxide are used with 100 pounds of barium carbonate, the material, when at high temperature, has a slight tendency to fuse together and to the kiln. If this amount is raised to 50 pounds, this condition is almost entirely eliminated. Amounts from 50 to 80 pounds are found most satisfactory. Amounts over 80 pounds do not appear to be of any added advantage.

*Example II.*—100 pounds of barium carbonate, about 100–130 pounds of limestone, 15 pounds of petroleum coke, and 15 pounds of byproduct coke are ground together to a fineness approximating 90% through a 200-mesh sieve, then passed through a rotary kiln and heated to about 2700° F. The resulting clinker is allowed to slake in cold water which it heats, due to its kiln temperature if immediately slaked and in any case to the exothermic reaction, and the soluble barium hydrate separated from the insoluble materials by filtration of the hot solution.

*Example III.*—100 pounds of barium carbonate, 100 pounds of limestone, 12 pounds of petroleum coke and 12 pounds of byproduct coke are ground together, agglomerated and passed slowly through a rotary kiln heated to about 2650° to 2750° F. in the hot zone, the resulting clinker treated with water and the soluble barium hydrate separated from the insoluble material.

*Example IV.*—100 pounds of barium carbonate, 90–120 pounds of dolomite, about 15–30 pounds of carbonaceous material, are ground to a fineness exceeding 100% through a 100-mesh sieve, agglomerated, passed through a kiln at about 2700° F. and the resulting clinker leached in water to separate the soluble barium hydrate from the insoluble materials.

Since the materials are heated in a kiln, it has been found highly advantageous, although not absolutely essential to practical yields, to use more than the amount of carbon necessary to theoretically convert the carbon dioxide of the barium carbonate to carbon monoxide, for there are usually some losses due to combustion of a part of the carbon added before the reaction is complete. The amount of carbon used is not limited to the specific amounts mentioned in the examples, but may be lowered or raised to conform to variable operating conditions. For best yields, however, the excess must be greater than the amount oxidized before the reaction is complete. The form of carbon used may be petroleum coke, byproduct coke, coal, bitumen, or any form of carbonaceous material or mixtures in any proportion. Bitumens, tars, resins or the like, may be used as reducing agent or mixed with the material in an amount sufficient to act as a binder in agglomerating the raw material.

It has been found advantageous to agglomerate the raw material before passing it through the kiln in order to protect the reducing material from contact with the combustion gases passing though the kiln. The agglomerating may be effected by moistening the material or by moistening and pressing in a briquetting machine or by adding a sufficient amount of bitumen or the like and briquetting. This agglomerating step may, however, be omitted and the dry powdered material passed through the heated kiln.

The materials which may be used in preventing the barium carbonate and reaction product from fusing together into large aggregates or to the kiln walls and for promoting the speed and completeness of the reaction are limestone, magnesite or dolomite, and mixtures or the calcined oxides or hydrates. The invention is not limited to the use of the amounts of lime, magnesia, etc., mentioned in the examples. The quantities are not sharply critical, as has been indicated, and may be varied more or less without loss of good results and within the scope of my invention. It has been found that the most advantageous temperature range is about 2500°–2800° F. at the hot point of the kiln. Variations from this range in either direction are possible, although these have been found satisfactory and are believed to be about the optimum.

The type of calcining kiln, according to the invention, may be rotary or vertical or any type which is adaptable to the process. The combustion gases may contact the material being heated. It is economical to carry out the process in an ordinary open rotary kiln fired with gas, oil or coal, but it is preferable to use a heating combustible containing as little silicious material as possible. The refractory lining of the kiln is preferably constructed of a high fusing refractory, such as magnesite. The entire kiln may be lined with such a material or only the hot zone; other high fusing refractories may also be used.

In order to avoid excessive combustion of the reducing material incorporated in the barium carbonate mixture it is of advantage to regulate the heating flame so that the atmosphere of the kiln will not be sharply oxidizing, but preferably near the neutral point. A neutral atmosphere, however, cannot in practice be perfectly realized. It is therefore advantageous to use an excess of carbon, whether the process is carried out in a slightly oxidizing atmosphere, or, in view of the reaction of carbon dioxide from sources extraneous to the reacting materials with the carbon thereof, even in a reducing atmosphere.

In order to effect economies in this process, the insoluble material obtained on separation of the soluble barium hydrate in the leaching process is with advantage reused, since it usually contains small percentages of undecomposed barium carbonate. This material may be brought back to its original proportions by the addition of barium carbonate and carbon and ground wet and dried, or the filter cake may be dried and the materials ground dry together. The reuse of the filter cake material may be continued until it becomes contaminated to such an extent that further reuse is impractical. The lime or dolomite in the case of reuse is in the hydrated form which may be partly recarbonated on drying. This in no way changes the scope of the invention, and it appears to have no detrimental effect in the process over the use of limestone or quick lime. It may be advantageous under certain conditions, such as the presence of easily fusible impurities, that a small quantity of fresh limestone, oxide or hydrate be added to the mixture at each recovery or that a certain percentage be replaced by fresh limestone, lime or hydrate at each recovery.

According to the invention, a small amount of a catalyst may be used to aid in completion of the calcium carbonate reduction. This catalyst may be one or more of the heavy metal group, metals, oxides or salts, for example nickel or iron, their oxide and salts, and may be added in the proportion of about 1 to 500 parts of the barium carbonate mixture. In most cases, the raw materials will contain some iron which may be sufficient or which may be increased by further additions.

The product of the reaction of the mixture of barium carbonate, carbon and lime material, since the barium is mostly in the form of barium oxide, may be sold or used in this form as a lump or ground material for the removal of soluble sulfates from ceramic clays, water softening and other allied applications.

I claim:

1. A process including the step of heating together an intimate mixture of barium carbonate, lime and carbonaceous material in an open kiln said carbonaceous material being present in relation to the barium carbonate in at least equi-molecular proportion.

2. In the process of converting barium carbonate to barium hydrate, the steps of heating an intimate mixture of barium carbonate, a substance of the class consisting of calcium and magnesium carbonates, oxides and hydrates or mixtures thereof and carbonaceous material in an open kiln and lixiviating the resulting clinker said carbonaceous material being present in relation to the barium carbonate in at least equi-molecular proportion.

3. In the process of converting barium carbonate to barium hydrate, the steps of heating an intimate mixture of barium carbonate, a substance of the class consisting of calcium and magnesium carbonates, oxides and hydrates or mixtures thereof and carbonaceous material in excess of the theoretical amount required to reduce the barium carbonate and other compounds present, in an open kiln and lixiviating the resulting clinker.

4. In the process of converting barium carbonate to barium hydrate, the steps of heating together an intimate mixture of barium carbonate, lime and carbonaceous material in an open kiln to a temperature of the order of from 2600° F. to 2800° F. and lixiviating the resulting clinker said carbonaceous material being present in relation to the barium carbonate in at least equi-molecular proportion.

5. In the process of converting barium carbonate to barium hydrate, the steps of heating an intimate mixture of barium carbonate, a carbonaceous material and a substance of the class consisting of calcium and magnesium carbonates, oxides and hydrates in an open kiln in such a way that the heating flame contacts the mixture being heated to a temperature of the order of 2700° F. and lixiviating the resulting clinker said carbonaceous material being present in relation to the barium carbonate in at least equi-molecular proportion.

6. In the process of converting barium carbonate to barium hydrate, the steps of heating together at clinkering temperature an intimate mixture of approximately 100 parts of barium carbonate, 50 to 80 parts of lime and 15 to 30 parts of carbonaceous material calculated as corbon in an open kiln and then lixiviating the resulting clinker, separating the hydrate from the mixture.

7. In the process of converting barium carbonate to barium hydrate, the steps of heating together at clinkering temperature an intimate mixture, ground to a fineness of about 90% through a 200-mesh sieve, of approximately 100 parts of barium carbonate, 50 to 80 parts of lime and 15 to 30 parts of carbonaceous material calculated as carbon in an open kiln and then lixiviating the resulting clinker and separating the hydrate from the mixture.

8. In the process of converting barium carbonate to barium hydrate, the steps of heating together at clinkering temperature an intimate mixture of barium carbonate, lime and carbonaceous material in at least the theoretical quantity to reduce barium carbonate in an open kiln, lixiviating the resulting clinker, separating the major portion of the barium content as the hydrate and returning the lime hydrate and its contained minor barium content for reuse in the process.

ROBERT ERWIN WINDECKER.